United States Patent [19]

Jamison et al.

[11] 3,871,302
[45] Mar. 18, 1975

[54] TROLLEY CONTROL SYSTEM

[75] Inventors: Will B. Jamison, Bethel Park; John F. Burr, Pittsburgh; Homayoun Hadi, Bethel Park, all of Pa.

[73] Assignee: Consolidation Coal Company, Pittsburgh, Pa.

[22] Filed: Sept. 26, 1973

[21] Appl. No.: 401,079

[52] U.S. Cl. .................. 104/153, 104/149, 191/8, 246/30
[51] Int. Cl. ..................... B60m 1/10, B61l 1/10
[58] Field of Search .................. 191/8, 2; 307/140; 317/137; 104/149, 148 R, 153; 246/30

[56] References Cited
UNITED STATES PATENTS
1,817,692  8/1931  Kloss et al. ............................ 191/8
2,478,133  8/1949  Shanklin ............................... 246/30

Primary Examiner—M. Henson Wood, Jr.
Assistant Examiner—Reinhard J. Eisenzopf

[57] ABSTRACT

A transmitting device mounted on a trolley vehicle for operation within an underground mine transmits a first coded signal through an overhanging transmission line that extends through the mine haulageway to a receiver and is arranged in parallel relation to the trolley wire. The receiver delivers an output signal to a circuit breaking device in response to the input signal received from the transmitting device. The output signal from the receiver adjusts the overload setting of the circuit breaking device to allow current flow from a rectified source to the trolley wire at a predetermined level as required for operation of the trolley vehicle above the minimum current level provided continuously on the trolley wire. The incremental increase of current through the trolley wire associated with a fault will exceed the overload setting of the circuit breaking device thereby opening the circuit breaking device to interrupt the flow of current passing through the trolley wire. an emergency "off" signal transmitted as a second coded signal to the receiver locks out all other signals being transmitted from other trolley vehicles to the receiver and thereby actuates the circuit breaking device to interrupt the flow of current to the trolley wire.

13 Claims, 3 Drawing Figures

3,871,302

TROLLEY CONTROL SYSTEM

BACKGROUND OF THE INVENTION

1. Field of the Invention

This invention relates to a trolley control system for selectively energizing the trolley wire in an underground mine and more particularly to a trolley control system which energizes the trolley wire at a preselected current level to accomplish a desired function in the mine.

2. Description of the Prior Art

The supply of direct current to a conventional trolley system in underground mines presents a continual threat of fire caused by a fault current capable of igniting coal, and other combustible materials present within the mine. In the past, it has been the practice to protect trolley systems in coal mines from fires resulting from faults by incorporating circuit breaking devices with overload relays in the trolley control system. With this arrangement, the current supplied to the trolley wire could be interrupted upon the occurrence of a fault. However, since the maximum normal load currents conveyed by the trolley wire may exceed 3,000 amperes on a 275 volt system, conventional overload relays are not capable of protecting the mine from fault currents in the range of 200 amperes.

One solution to the problem above described is found in a trolley control system which provides transmission of a radio signal from a vehicle to a receiving wire extending over the length of the trolley wire served by a particular breaker. A receiver positioned adjacent to the breaker closes the breaker when it receives the radio signal transmitted along the receiving wire. In this fashion, the trolley wire section is energized only when a vehicle requires power. The transmission of the radio signal from the vehicle is controlled by a "dead-man" switch that the operator maintains in closed position to supply power to the vehicle. While this system cannot protect against the occurrence of a fault while the controlled section of the trolley wire is energized, it can reduce exposure and permit opening of the circuit breaker by the vehicle operator if he should see the fault. However, this system does not protect against the situation in which a trolley wire has fallen onto or against the trolley rail. If a ground fault were to occur while the trolley was not energized, operation of the system to close the breaker would close the breaker on the fault.

There is need for a trolley control system that protects against fires resulting from a fault by maintaining the trolley wire energized at all times but by protecting it with a low current level overload device which actuates to open the circuit and deenergize the trolley wire upon the occurrence of a fault. When greater load demands are required to accomplish a desired function, transmission of a coded signal to a receiver must adjust the overload device and allow the flow of current to the trolley wire as needed.

SUMMARY OF THE INVENTION

This invention relates to a trolley control system for energizing a trolley wire by controlling the supply of electric current to the trolley wire for accomplishing a desired function. The trolley control system includes a transmitting device for transmitting a first coded signal to a receiving device positioned remote from the transmitting device. A circuit breaking device for controlling the flow of electric current to the trolley wire is actuated by the receiving device to provide flow of electric current to the trolley wire and thereby energize the trolley wire at a preselected current magnitude. The transmitting device is operable to transmit a second coded signal to the receiving device. The circuit breaking device is actuated by the receiving means upon receipt of the second coded signal to deenergize the trolley wire even if the first coded signal is being transmitted to the receiving means.

The transmitting device is mounted to a trolley vehicle and includes an antenna arranged in cooperation with the transmitting device on the trolley vehicle. The transmitting device is operable to transmit coded electromagnetic signals from the antenna to a pick-up wire suitably positioned adjacent the antenna and connected to the receiving device. The pick-up wire is an insulated transmission line arranged in parallel relation to the trolley wire. Electromagnetic signals transmitted from the antenna of the transmitting device pass through the transmission line to the receiving device. Upon reception of the coded signals, the receiving device actuates the circuit breaking device to permit the flow of electric current to the trolley wire at a preselected level above a minimum level, provided continuously on the trolley wire, by adjusting the overload setting. With this arrangement, an increase in current flow to the trolley wire is provided by adjusting the overload setting of the circuit breaking device. The incremental increase in current flow through the trolley wire associated with a fault would open the circuit breaking device to terminate the flow of current at any level through the trolley wire.

Accordingly, the principal object of this invention is to provide a trolley control system for use in underground mines that protects against the hazard of fire as the result of ground faults which may be lower in magnitude than current levels occasionally required to power trolley vehicles.

Another object of this invention is to provide a trolley control system for use in underground mines that is divided into blocks which are selectively energized to provide current flow above a minimum level when needed for operation of equipment in a specific block.

Another object of this invention is to provide a trolley control system that requires the manual operation of a transmitting device operable to actuate an overload device for supplying direct current to a trolley wire.

Still another object of this invention is to provide a trolley control system adapted to provide a plurality of current levels which may be preselected and applied as needed to the trolley wire for a desired function.

A further object of this invention is to provide a trolley control system in which one coded signal has priority over all other coded signals for use as an emergency signal to deenergize the trolley control system while the other signals continue to be transmitted for energizing the trolley system.

These and other objects of this invention will be more completely described and disclosed in the following specification, the accompanying drawings and the appended claims.

DESCRIPTION OF THE PREFERRED EMBODIMENTS

Figure 1:
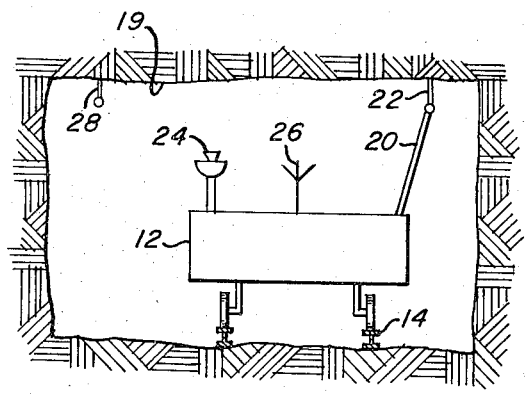
FIG. 1 is a schematic representation of the trolley control system illustrating the arrangement of the trolley wire and the pick-up wire in the mine haulageway.
Figure 2:
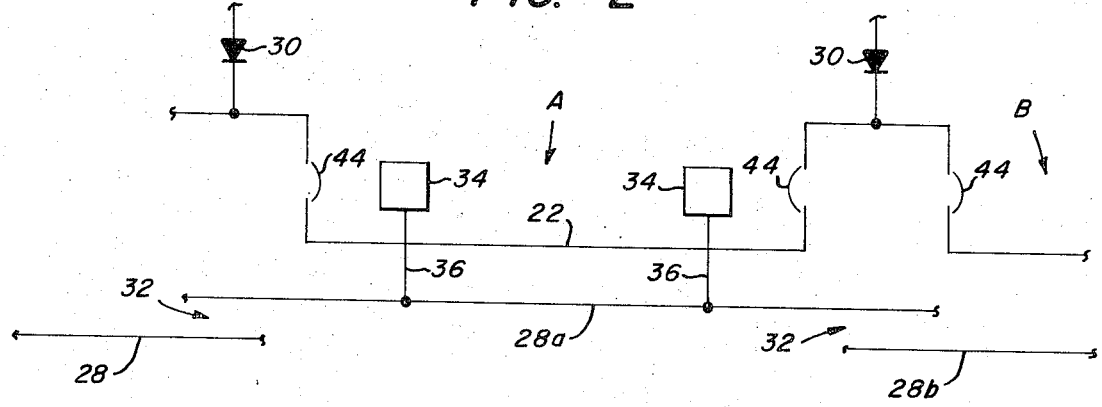
FIG. 2 is a schematic diagram of the trolley control system, illustrating a representative portion of the preferred network according to the present invention.

Referring to the drawings and particularly FIGS. 1 and 2, there is illustrated a trolley control system generally designated by the numeral 10 that includes a trolley vehicle 12 motivated on tracks 14 within the haulageway 18 of an underground mine. The trolley vehicle 12 is provided with a trolley pole 20 that is mounted on the body portion of the trolley vehicle 12 and extends upwardly therefrom into electrical contact with a trolley wire 22. The trolley wire 22 is positioned in the haulageway 18 adjacent the mine roof 19. The trolley wire 22 supplies direct current to the trolley vehicle motor for propelling the trolley vehicle 12 on the tracks 14.

The trolley control system 10 includes a transmitting device 24, such as a battery powered radio, equipped with an antenna 26, preferably a loop antenna, wound on a relatively long and narrow form. The transmitting device 24 and the antenna 26 transmit signals in the form of electromagnetic waves to a pick-up wire 28 that is arranged in parallel relation to the trolley wire 22 and extends the length of the haulageway 18 in the mine. The pick-up wire 28 is secured to the mine roof 19 and hangs downwardly therefrom. The antenna 26 is mounted on the trolley vehicle 12 so that the antenna is maintained within a suitable distance for radiating signals to the pick-up wire 28. With this arrangement, only the portion of the wire 28 close to the trolley vehicle 12 will receive the signal from the transmitting device 24. Once the signals are received by the pick-up wire 28, they travel the entire length of the wire 28. The pick-up wire 28 is an electrically insulated conductor, and any insulated transmission line suitable for the purpose of carrying electromagnetic signals transmitted from the transmitting device 24 may be used. The transmitting device 24 is either frequency or amplitude modulated, preferably within the range of 30 kilo hertz to 1 mega hertz.

As illustrated in FIG. 2, rectifiers 30 are positioned at regular intervals within the haulageway 18 and provide for conversion of alternating current from a source (not shown) to direct current supplied to the trolley wire 22. The pick-up wire 28 is broken at preselected points generally designated by the numeral 32 throughout the haulageway 18 and is arranged to provide overlapping sections at each of the rectifiers 30. Thus, the rectifiers 30 provide convenient location for separating the trolley wire 22 and the pick-up wire 28 into corresponding blocks. Any number of blocks may be provided throughout the length of the haulageway 18 depending upon the number of rectifiers 30 present therein. The pick-up wire 28A of Block A, as shown in FIG. 2, extends the length of Block A and also a short distance into the adjacent Block B. The overlapping portions of the pick-up wires 28A and 28B at the intersection point 32 of the Blocks A and B permit energizing of Block B before the trolley vehicle 12 reaches Block B. At the intersection point 32, the pick-up wire 28A of Block A must be separated from the pick-up wire 28B of Block B by a distance (approximately 2 feet) which is sufficient to insure that signals on the pick-up wire 28A of Block A will not couple to the pick-up wire 28B of Block B.

The transmitting device 24 is operable to transmit a coded electromagnetic signal from the antenna 26 to the pick-up wire 28. The transmitted signal is received by the pick-up wire 28 and is conveyed to a receiver unit 34. The receiver unit 34 is tied into the pick-up wire 28 by a cable 36, as illustrated in FIG. 2. The receiver 34 demodulates the signal input from the transmitting device 24 and provides a corresponding output signal to a circuit breaker 44 positioned adjacent the receiver 34.

The circuit breaker 44 is maintained in a normally closed position to provide continuous flow of rectified current at a minimum level from the rectifier 30 to the trolley wire 22. However, the overload setting of the circuit breaker 44 is set at an incremental level above the minimum current level passing through the wire 22 sufficient to satisfy the load requirements of small fixed loads such as lighting and pumps. If a fault should occur as a result of a roof fall, bringing the trolley wire 22 into electrical contact with the trolley track 14, the incremental increase in the current flowing through the trolley wire 22, as a result of the fault, will exceed the overload setting of the circuit breaker 44. The incremental increase in current will then trigger the breaker 44 to open the circuit and thereby interrupt the flow of current to the trolley wire 22. A circuit breaker suitable for use in the present invention is sold by I-T-E Imperial Corporation, Horsham, Pa. 19044. This I-T-E- circuit breaker is model I-T-E-76 solid state DC overcurrent relay. This circuit breaker relay device is approximately 9 inch × 7 inch × 5 inch and is powered from a 120 alternating current voltage source. The unit when used with a shunt can provide instantaneous protection at any one of ten preselected levels. These levels are 10, 20, 30, 40, 50, 60, 70, 80, 90 and 100 mV.

For operation of electrically powered equipment requiring greater current loads in haulageway 18, such as jeeps, portal buses, locomotives and the like, the overload setting of the circuit breaker 44 is selectively adjusted to allow increased current flow from the rectifier 30 to the trolley wire 22. For example, if jeeps and portal buses are to be operated in Block A of the haulageway 18, the setting of the circuit breaker 44 must be adjusted from the normal low setting required for lighting and pumps, which is in the range of 100 amperes, to a higher setting that will permit passage of current for operation of jeeps and portal buses, generally in the range of 500 amperes.

The operator of the trolley vehicle 12 transmits a first coded signal from the transmitting device 24. The signal is conveyed by the pick-up wire 28 to the receiver 34 in Block A. The receiver 34 demodulates the incoming first coded signal and provides a corresponding output signal to the circuit breaker 44. Thus, the circuit breaker 44 is actuated by the first coded signal received from the receiver 34 to operate at an overload setting greater than that normally provided to thereby accommodate the increased current demands of jeeps and portal buses. In this fashion, an increased current flow is available through the trolley wire 22 to meet the increased demand for power in Block A which has been energized at a higher level of current flow than provided in Block B and in other blocks of the haulageway 18. Should a fault in the trolley wire 22 take place, the incremental increase in the current attributed to the presence of a fault, for example 200 amperes, would exceed the overload setting of the circuit breaker 44 and trigger the circuit breaker to open. Opening the circuit breaker 44 in this fashion interrupts the flow of current to the trolley wire 22 in Block A to thereby deenergize the trolley wire 22.

Similarly, to meet the demands of even larger electrical equipment, such as locomotives and other large haulage vehicles which require current levels of up to 3000 amperes, the transmitting device 24 is operable to transmit a third coded signal. The receiver 34 responding to the third coded signal received from the transmitting device 24 supplies an output to the circuit breaker 44 which adjusts the overload setting thereof to permit current flow at still a greater magnitude than that normally provided from the rectifier 30 to the trolley wire 22 in Block A. Once again, if a fault in the trolley wire 22 should occur, the increased current resulting therefrom would exceed the overload setting of the circuit breaker 44. The circuit breaker 44 is then opened and the trolley wire 22 in Block A is deenergized.

When the trolley vehicle 12 reaches a location in Block A sufficiently close to the intersection point 32 so that the antenna 26 is within range to couple signals from the transmitting device 24 to the pick-up wire 28B of Block B, the receiver (not shown) in Block B responds to the selected coded signal by providing a corresponding output signal to the circuit breaker in Block B. Consequently, the overload setting of the circuit breaker is adjusted to a higher level to provide the level of current flow demanded by the trolley vehicle 12 in Block B. Thus, the overlapping of pick-up wires 28A and 28B at the intersection point 32 provides for the energizing of Block B before the trolley vehicle 12 reaches Block B. The trolley vehicle 12 is then able to move continuously without interruption of current to the trolley wire from Block A to Block B and so on throughout the length of the haulageway 18. With the above described arrangement, in addition to the normal low level current continuously passing through the trolley wire 22, only the current that is required to meet the needs of a particular load passes through the trolley wire 22. The risks associated with the presence of a ground fault are then virtually eliminated by the fact that a specific block of the trolley wire 22 is energized only as required to meet the specific current demands within that block at any particular time.

In the situation where two or more trolley vehicles are present within Block A or any other block of the haulageway 18 each vehicle is able to energize the trolley wire 22 independently of the other. A problem occurs when the operator of one trolley vehicle observes a ground fault and is unable to deenergize the trolley wire 22 by terminating his transmission to the pick-up wire 28A due to the presence of other trolley vehicles also transmitting signals in Block A. Therefore, in solving this problem the operator who observes the presence of the fault in Block A initiates transmission of an emergency "off" signal to the receiver 34 which overrides all other signals being supplied to the receiver 34 by other transmitting devices within Block A. The effect of transmitting the emergency "off" signal is to open the circuit breaker 44 and thereby deenergize the trolley wire of Block A even though other trolley vehicles within Block A continue to transmit signals to the receiver 34.

When the trolley vehicle 12 has passed through Block A and no other vehicles remain within that block, the overload protection of the trolley wire 22 of Block A subsequently returns to the low current level normally provided by operation of the circuit breaker 44. Thus, a block of the trolley wire 22 is energized above its normal low current level only when a trolley vehicle is present within that particular block of the trolley wire 22 and transmits a coded signal to the receiver 34 and thereby adjusts the overload setting of the circuit breaker 44 above the normal low current overload setting thereof. Accordingly, the overload protection of the trolley wire 22 in a specific block may be selectively shifted from one current level to another within a given range to meet necessary equipment needs by the transmission of selected coded signals.

Figure 3:
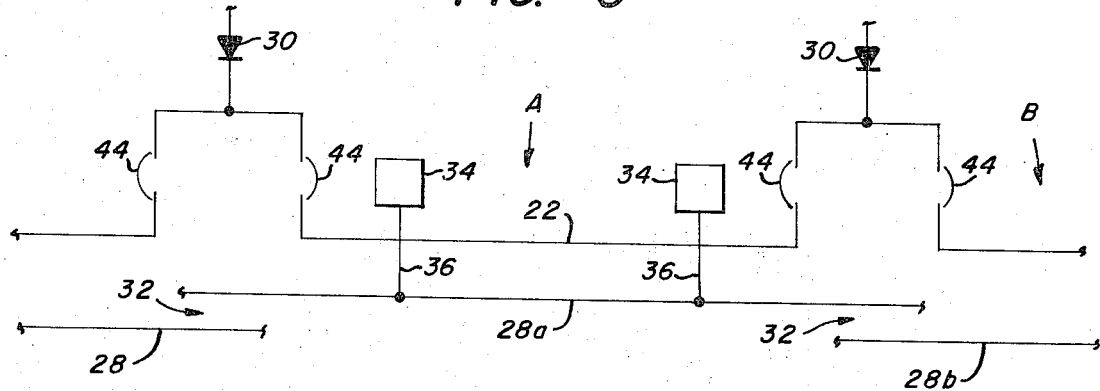
FIG. 3 is a schematic diagram of the trolley control system similar to FIG. 2, illustrating another embodiment of the present invention.

In a further embodiment of the present invention illustrated in FIG. 3, a main receiver 34 is located at a rectifier 30 in Block A, and an auxiliary receiver 46 coupled to the pick-up wire 28 by cable 48 is located at rectifier 50. The receiver 34 demodulates the signal input from the transmitting device 24. The receiver 34 is also utilized to supply auxiliary d.c. signals through wire 36 to the pick-up wire 28A for operation of the auxiliary receiver 46 located at rectifier 50. The auxiliary receiver 46 will then close the circuit breaker 52 responsive to the selected signal received by the receiver 34. Thus, by utilizing the receiver 34 to actuate the circuit breaker 52 though the auxiliary receiver 46, the need for providing another main receiver within Block A is eliminated.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. Apparatus for controlling the supply of electric current to a trolley wire comprising,
   a transmitting means for transmitting a first coded signal,
   receiving means for receiving the first coded signal,
   said receiving means positioned remote of said transmitting means,
   circuit breaking means for controlling the flow of electric current to said trolley wire,
   said circuit breaking means actuated by said receiving means upon receipt of the first coded signal to provide flow of electric current to said trolley wire and thereby energize said trolley wire at a preselected current magnitude,
   said transmitting means operable to transmit a second coded signal to said receiving means, and
   said circuit breaking means actuated by said receiving means upon receipt of the second coded signal to override said first coded signal which is transmitted from another transmitting means in order to interrupt current flow to said trolley wire.

2. Apparatus for controlling the supply of electric current to a trolley wire as set forth in claim 1 in which said transmitting means includes, a transmitting device mounted to a trolley vehicle, an antenna arranged in cooperation with said transmitting device on the trolley vehicle, said transmitting device operable to emit coded signals from said antenna.

3. Apparatus for controlling the supply of electric current to a trolley wire as set forth in claim 2 in which, said transmitting device is operable to emit from said antenna coded signals at a given frequency selected from a plurality of frequencies within the range of 30 kilo hertz to 1 mega hertz.

4. Apparatus for controlling the supply of electric current to a trolley wire as set forth in claim 2 which includes, a pick-up wire suitably positioned adjacent to said antenna and connected to said receiving means, said pick-up arranged to receive electromagnetic signals transmitted from said transmitting device and conduct said electromagnetic signals to said receiving means.

5. Apparatus for controlling the supply of electric current to a trolley wire as set forth in claim 4 in which, said pick-up wire includes an insulated transmission line arranged in parallel relation to said trolley wire, said transmission line operable to provide the passage of electromagnetic signals transmitted by said transmitting means to said receiving means.

6. Apparatus for controlling the supply of electric current to a trolley wire as set forth in claim 5 which includes, said transmission line and said trolley wire divided into a plurality of corresponding blocks each having said receiver means and said circuit breaking means provided therein, each of said trolley wire blocks supplied with a continuous flow of electric current maintained at a minimum level.

7. Apparatus for controlling the supply of electric current to a trolley wire as set forth in claim 6 which includes, each of said trolley wire blocks being selectively energized at a predetermined current level above said minimum level by the transmission of coded signals through each of said corresponding transmission line blocks to said receiving means for actuation of said circuit breaking means to permit current flow to said preselected trolley wire block.

8. Apparatus for controlling the supply of electric current to a trolley wire as set forth in claim 1 in which said circuit breaking means includes, a circuit breaking device maintained in a normally closed position to thereby provide continuous flow of electric current at a predetermined level to said trolley wire, said circuit breaking device operable to open and interrupt the flow of electric current to said trolley wire when a fault in said trolley wire occurs.

9. Apparatus for controlling the supply of electric current to a trolley wire as set forth in claim 8 in which, said circuit breaking device includes an overload setting adjustable to permit flow of electric current at an increased level to said trolley wire.

10. Apparatus for controlling the supply of electric current to a trolley wire as set forth in claim 9 in which, said transmitting means is operable to transmit coded signals to said receiving means to thereby actuate said circuit breaking device so that the overload setting thereof is adjusted to permit the flow of electric current to said trolley wire at a predetermined level.

11. Apparatus for controlling the supply of electric current to a trolley wire as set forth in claim 1 in which said receiving means includes, a main receiver which receives the signal from said transmitting means and supplies a first signal to actuate said circuit breaking means and a second signal, and an auxiliary receiver electrically coupled to said main receiver to receive the second signal from said main receiver and supply an auxiliary output signal responsive to the signal of said transmitting means to actuate another of said circuit breaking means.

12. Apparatus for controlling the supply of electric current to a trolley wire comprising, a transmitting means for transmitting a first coded signal, receiving means for receiving the first coded signal, said receiving means positioned remote to said transmitting means, circuit breaking means for controlling the flow of electric current to said trolley wire, said circuit breaking means operable to allow a minimum current level to flow continually into said trolley wire and to interrupt the flow of said minimum current level when a fault in said trolley wire occurs, said circuit breaking means actuated by said receiving means upon receipt of the first coded signal to provide flow of electric current to said trolley wire and thereby energize said trolley wire at a preselected current magnitude over the minimum current level already flowing through said trolley wire, and said circuit breaking means returning said trolley wire to said minimum current level in the absence of the first coded signal being transmitted to said receiving means in order to allow said minimum current level to flow through said trolley wire.

13. Apparatus for controlling the supply of electric current to a trolley wire as set forth in claim 12 which includes, said transmitting means operable to transmit a second coded signal to said receiving means, and said circuit breaking means actuated by said receiving means upon receipt of the second coded signal to completely interrupt current flow to said trolley wire even though said first coded signal is transmitted from another transmitting means.

* * * * *